United States Patent
Kinoshita

(10) Patent No.: US 9,001,217 B2
(45) Date of Patent: Apr. 7, 2015

(54) INFORMATION PROCESSING APPARATUS, METHOD FOR DISPLAYING LIVE VIEW IMAGE, AND STORAGE MEDIUM STORING PROGRAM THEREFOR

(75) Inventor: Yuichi Kinoshita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/014,661

(22) Filed: Jan. 26, 2011

(65) Prior Publication Data
US 2011/0181739 A1 Jul. 28, 2011

(30) Foreign Application Priority Data
Jan. 28, 2010 (JP) ................................. 2010-017009

(51) Int. Cl.
H04N 5/225 (2006.01)
H04N 5/232 (2006.01)
H04N 5/262 (2006.01)

(52) U.S. Cl.
CPC ................................. H04N 5/23293 (2013.01)

(58) Field of Classification Search
CPC ................................ H04N 5/232; H04N 5/225
USPC .......... 348/231, 333.03, 333.12, 239, 211.99, 348/211.3, 211.4, 211.5, 207.11, 211.8, 348/211.9; 345/629; 382/284
See application file for complete search history.

(56) References Cited

U.S. PATENT DOCUMENTS

| | | | | |
|---|---|---|---|---|
| 5,986,718 | A * | 11/1999 | Barwacz et al. | 348/592 |
| 6,687,453 | B1 * | 2/2004 | Sakamoto et al. | 386/225 |
| 7,136,096 | B1 * | 11/2006 | Yamagishi et al. | 348/218.1 |
| 7,623,733 | B2 * | 11/2009 | Hirosawa | 382/284 |
| 2006/0098112 | A1 * | 5/2006 | Kelly | 348/333.12 |
| 2008/0109729 | A1 * | 5/2008 | Notea et al. | 715/722 |
| 2010/0275122 | A1 * | 10/2010 | Buxton et al. | 715/728 |
| 2011/0115816 | A1 * | 5/2011 | Brackney | 345/629 |
| 2011/0153341 | A1 * | 6/2011 | Diaz-Cortes | 705/2 |
| 2011/0310247 | A1 * | 12/2011 | Rensin et al. | 348/143 |
| 2014/0011428 | A1 * | 1/2014 | Barthold | 446/268 |

FOREIGN PATENT DOCUMENTS

| | | |
|---|---|---|
| JP | 2005-102263 A | 4/2005 |
| JP | 2006-352255 A | 12/2006 |
| JP | 2008-216660A A | 9/2008 |

* cited by examiner

Primary Examiner — Nhan T Tran
Assistant Examiner — Chan Nguyen
(74) Attorney, Agent, or Firm — Canon USA, Inc., IP Division

(57) ABSTRACT

The present invention is directed to an information processing apparatus which receives a live view image from an imaging apparatus and displays the live view image by overlaying a predetermined overlay image thereto on a screen and the live view image when various operations regarding shooting processing are performed by the imaging apparatus. The information processing apparatus sets whether to display the overlay image by overlaying it onto the live view image or not for each type of an instruction to the imaging apparatus. When the information processing apparatus receives an instruction in response to a user operation, it detects the type of the instruction. When the overlay image is set to be displayed for the detected type of the instruction, the information processing apparatus displays the overlay image by overlaying it onto the live view image.

14 Claims, 8 Drawing Sheets

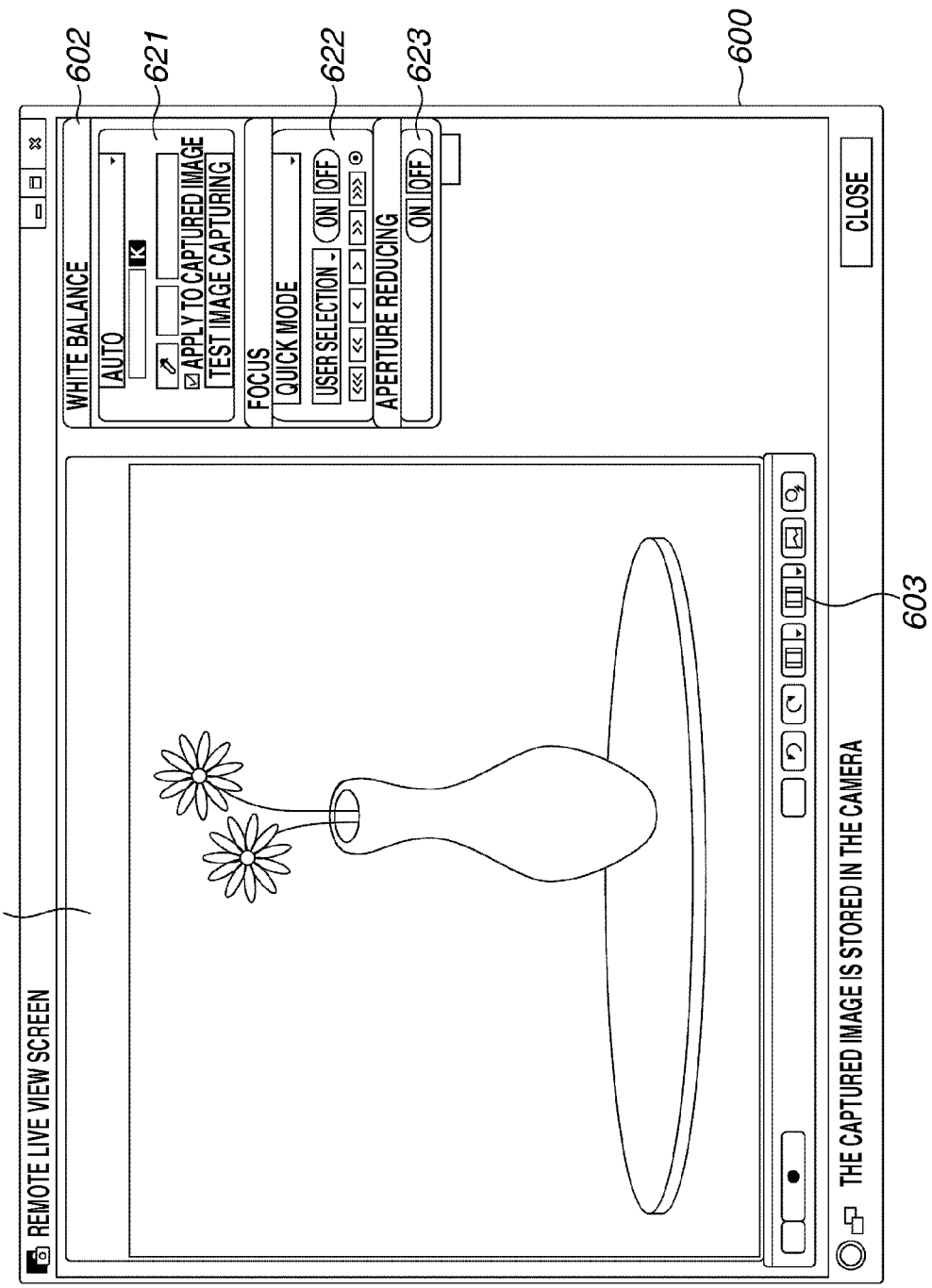

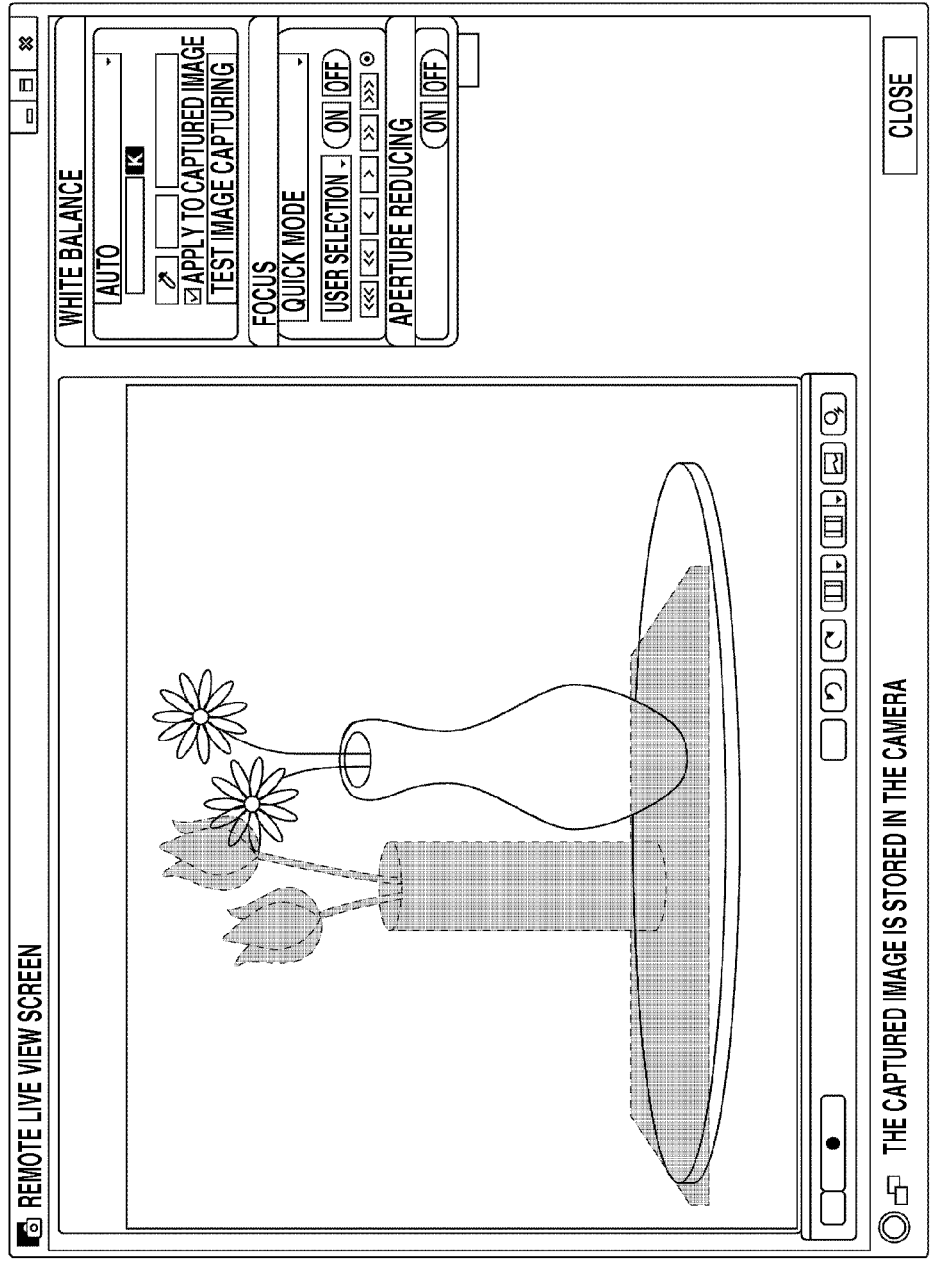

INFORMATION PROCESSING APPARATUS, METHOD FOR DISPLAYING LIVE VIEW IMAGE, AND STORAGE MEDIUM STORING PROGRAM THEREFOR

BACKGROUND OF THE INVENTION

1. Field of the Invention

The present invention relates to an information processing apparatus which receives a live view image, i.e., an image currently being captured, from an imaging apparatus and displays the live view image on a screen. The present invention also relates to a method and program for controlling the information processing apparatus.

2. Description of the Related Art

Conventionally, an information processing apparatus such as a personal computer performs remote shooting in which the information processing apparatus communicates with a camera apparatus to control its shooting operations, receives a remotely captured image from the camera apparatus, and displays it on a display.

Further, the camera apparatus performs test shooting and actual shooting in succession, combines a through-the-lens image in the actual shooting with a through-the-lens image in the test shooting which has been made semi-transparent, and displays the combined image on the monitor of the camera apparatus, thus adjustment of composition in the actual shooting can be facilitated.

As described above, in the actual shooting, when the through-the-lens image combined with the through-the-lens image in the test shooting is displayed on the monitor instead of a regular through-the-lens image, the through-the-lens image in the test shooting disturbs the through-the-lens image in the actual shooting. Thus, it may be difficult to clearly check details of the through-the-lens image in the actual shooting. Therefore, when a photographer directly half-presses a shutter release button of the camera apparatus, the camera apparatus displays the regular through-the-lens image instead of the combined image.

However, in the above described remote shooting, the information processing apparatus can issue various shooting instructions to the camera apparatus. For example, when determining composition of an image, a user may instruct the information processing apparatus to display grid lines on the display and to change the aspect ratio. There has been a user demand to keep displaying the through-the-lens image in test shooting to align the composition when the user issues these instructions.

SUMMARY OF THE INVENTION

The present invention is directed to a technique, when an information processing apparatus receives a live view image from an imaging apparatus and displays the live view image by overlaying onto a predetermined overlay image on a screen and a user of the information processing apparatus performs various operations regarding shooting processing by the imaging apparatus, enabling the user to easily check the predetermined overlay image and the live view image.

According to an aspect of the present invention, an information processing apparatus for issuing an instruction for shooting to a remote imaging apparatus, receiving from the imaging apparatus a live view image obtained by shooting processing based on the instruction, and displaying the live view image on a screen includes a storage unit configured to store an overlay image in advance in a storage device, a display unit configured to overlay the overlay image onto the live view image and display the overlay image on the screen, a setting unit configured to set whether to display the overlay image by overlaying onto the live view image or not for each type of instruction to the imaging apparatus, a detection unit configured to detect, upon reception of the instruction in response to a user operation, the type of the instruction, and a canceling unit configured to cancel displaying the overlay image if the overlay image is set not to be displayed by being overlaid onto the live view image for the detected type of the instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6C illustrate a remote live view screen to be displayed on the display according to the first exemplary embodiment of the present invention.

DESCRIPTION OF THE EMBODIMENTS

Various exemplary embodiments, features, and aspects of the invention will be described in detail below with reference to the drawings.

Figure 1:
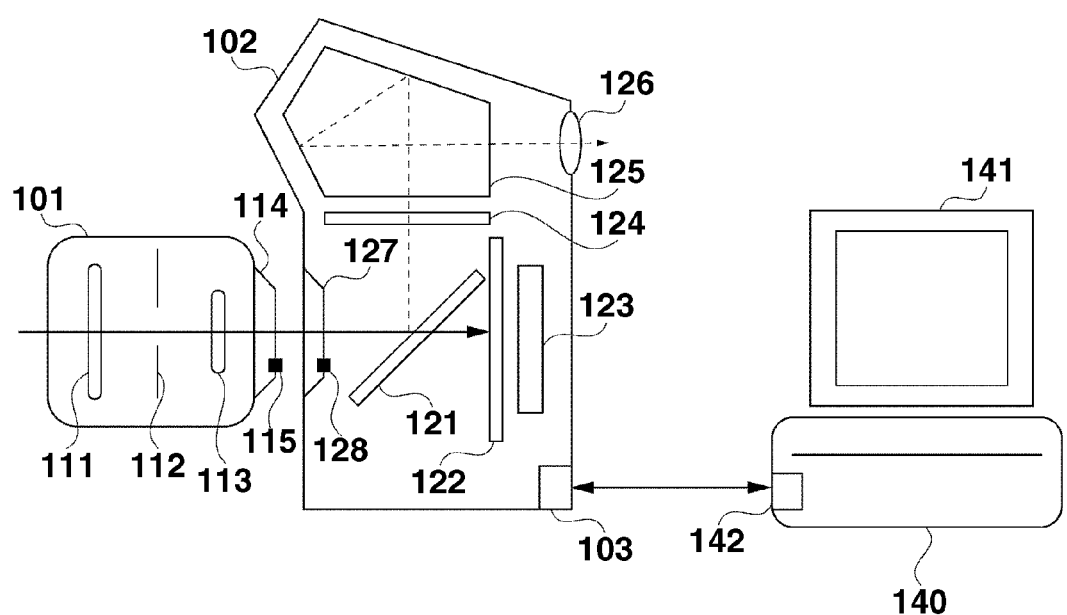
FIG. 1 is a block diagram illustrating a configuration of a remote shooting system according to a first exemplary embodiment of the present invention.

In a remote shooting system according to a first exemplary embodiment, an information processing apparatus is connected with an imaging apparatus via a universal serial bus (USB) cable or communication media such as wireless local area network (LAN) to enable communication between the two apparatuses. FIG. 1 illustrates the remote shooting system according to the present exemplary embodiment which implements the imaging apparatus with an interchangeable lens-type digital camera and the information processing apparatus with a personal computer.

Referring to FIG. 1, an imaging apparatus 102 is the body of the digital camera and is combined with an exchangeable lens 101. The exchangeable lens 101 includes a zoom lens 111 for changing a focal length, an aperture mechanism 112 for controlling luminance, and a focus lens 113 for focusing a subject. A mounting portion 114 on the exchangeable lens 101 side is mechanically joined with a mounting portion 127 of the imaging apparatus 102.

In the imaging apparatus 102, light that has passed through the exchangeable lens 101 is reflected by a half mirror 121, and forms an image on a focusing screen 124. The light focusing on the focusing screen 124 is reversed by a prism 125 and can be observed as an erect image through an eyepiece lens 126. When an image is captured, the half mirror 121 is flipped up and a shutter 122 opens, and the light that has passed through the exchangeable lens 101 forms an image on an image sensor 123.

The mounting portion 114 of the exchangeable lens 101 includes a contact group 115. The contact group 115 is a connecting member for receiving power supply from the imaging apparatus 102 to the exchangeable lens 101 and enabling communication therebetween. The contact group 115 includes contacts used for the power supply, ground, transmission, reception, clock, and so on. Connection terminals in the contact group 115 of the mounting portion 114 of the exchangeable lens 101 are joined with respective connection terminals in a contact group 128 of the mounting portion 127 of the imaging apparatus 102.

The imaging apparatus 102 connects with a personal computer 140 via a connecting portion 103 to transmit and receive various types of data. When the imaging apparatus 102 transmits a live view image to the personal computer 140 via the connecting portion 103, the live view image is displayed on a display 141. The imaging apparatus 102 also receives various pieces of information for controlling shooting from the personal computer 140 and performs shooting operations according to the information.

Figure 2:
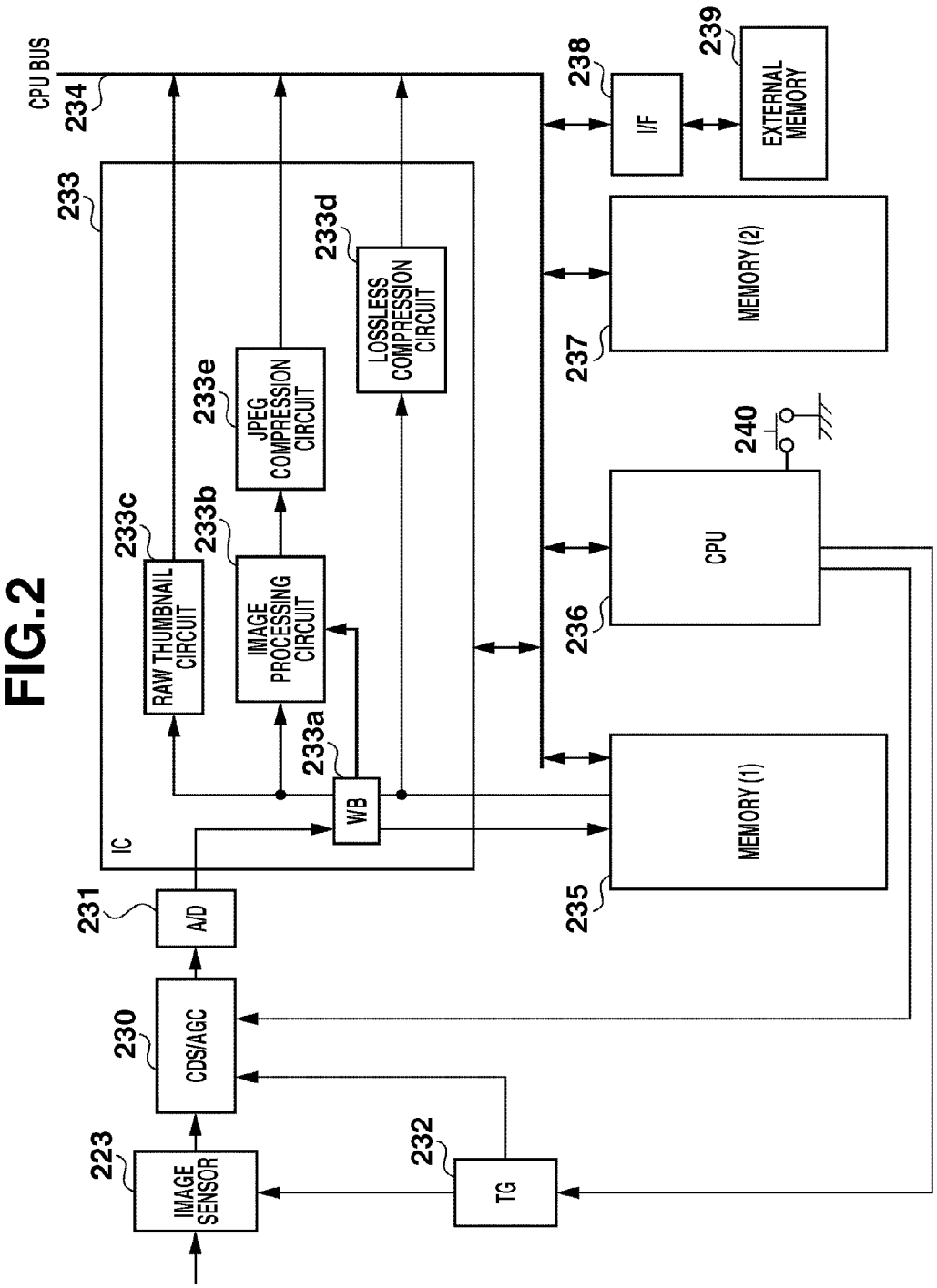
FIG. 2 is a block diagram illustrating a configuration of an imaging apparatus according to the first exemplary embodiment of the present invention.

The configuration of the imaging apparatus 102 will be described below with reference to FIG. 2. An image sensor 223 may be a charge coupled device (CCD) sensor or a complementary metal oxide semiconductor (CMOS) sensor. Each pixel converts the light forming an image on the image sensor 223 into an electric charge according to an amount of the incident light. A signal generated by a timing generator 232 drives the image sensor 223 to transmit electric charges accumulated in the image sensor 223 and is sequentially convert to a voltage signal. Correlated double sampling (CDS) 230 samples the converted voltage signal and an analog-to-digital (A/D) converter 231 converts the voltage signal to a digital signal.

The digital signal is converted into image data. The image data is input to an integrated circuit (IC) 233. In the IC 233, the image data is input to a WB circuit 233a for calculating for white balance for data and stored in a memory unit (1) 235. The data stored in the memory unit (1) 235 is input to the IC 233 again and subjected to the following three different types of image processing. Firstly, a lossless compression circuit 233d for applying lossless compression converts the image data to lossless-compressed RAW data and transmits the RAW data to a central processing unit (CPU) bus 234.

The RAW data is subjected to inter-block averaging or low-pass filtering to reduce a band, and then subjected to thinning, so that the image data is subjected to down sampling. Secondly, to convert the image data to a thumbnail image having a smaller size than an original image size, a RAW thumbnail circuit 233c thins out the image data and transmits the thinned-out image data to the CPU bus 234.

Thirdly, to generate Joint Photographic Experts Group (JPEG) compressed image data, an image processing circuit 233b applies image processing to the image data. A YCbCr signal output as a result of the image processing is subjected to raster block conversion. Then, a JPEG compression circuit 233e applies JPEG compression to the YCbCr signal and transmits the JPEG-compressed image data to the CPU bus 234.

Immediately after the power is supplied, a central processing unit (CPU) 236 initializes the imaging apparatus 102 and starts communication with the exchangeable lens 101 following a program stored in a memory unit (2) 237. The CPU 236 once stores in the memory unit (1) 235 the captured image data output to the CPU bus 234 and finally stores it in an external memory 239 via an interface circuit 238.

A release switch 240 is connected to the CPU 236. When the CPU 236 detects pressing of the release switch 240, the CPU 236 executes the above described shooting operation and stores the captured image in the external memory 239.

When a live view image is displayed, the CPU 236 raises a half mirror 221 and opens a shutter 222 to form an image on the image sensor 223 by the light that has passed through the exchangeable lens 101, and converts the image into a digital signal to acquire the live view image. Then, the CPU 236 stores the live view image in the memory unit (2) 237 and displays the live view image on a rear display of the imaging apparatus 102. The CPU 236 updates the live view image at fixed intervals.

Similar to checking a subject through an optical finder, a photographer can check the subject with the live view image on the rear display. Upon reception of an instruction to execute a live view function from the information processing apparatus 300, the CPU 236 transmits the live view image to the information processing apparatus 300 at fixed intervals.

A configuration of a computer apparatus serving as the information processing apparatus 300 according to the present exemplary embodiment will be described below with reference to FIG. 3. The information processing apparatus 300 may be implemented as a single computer apparatus, or with a necessary number of computer apparatuses on which necessary functions are distributed. When a plurality of computer apparatuses constitutes the information processing apparatus 300, they are connected via a local area network (LAN) to enable communication therebetween.

Figure 3:
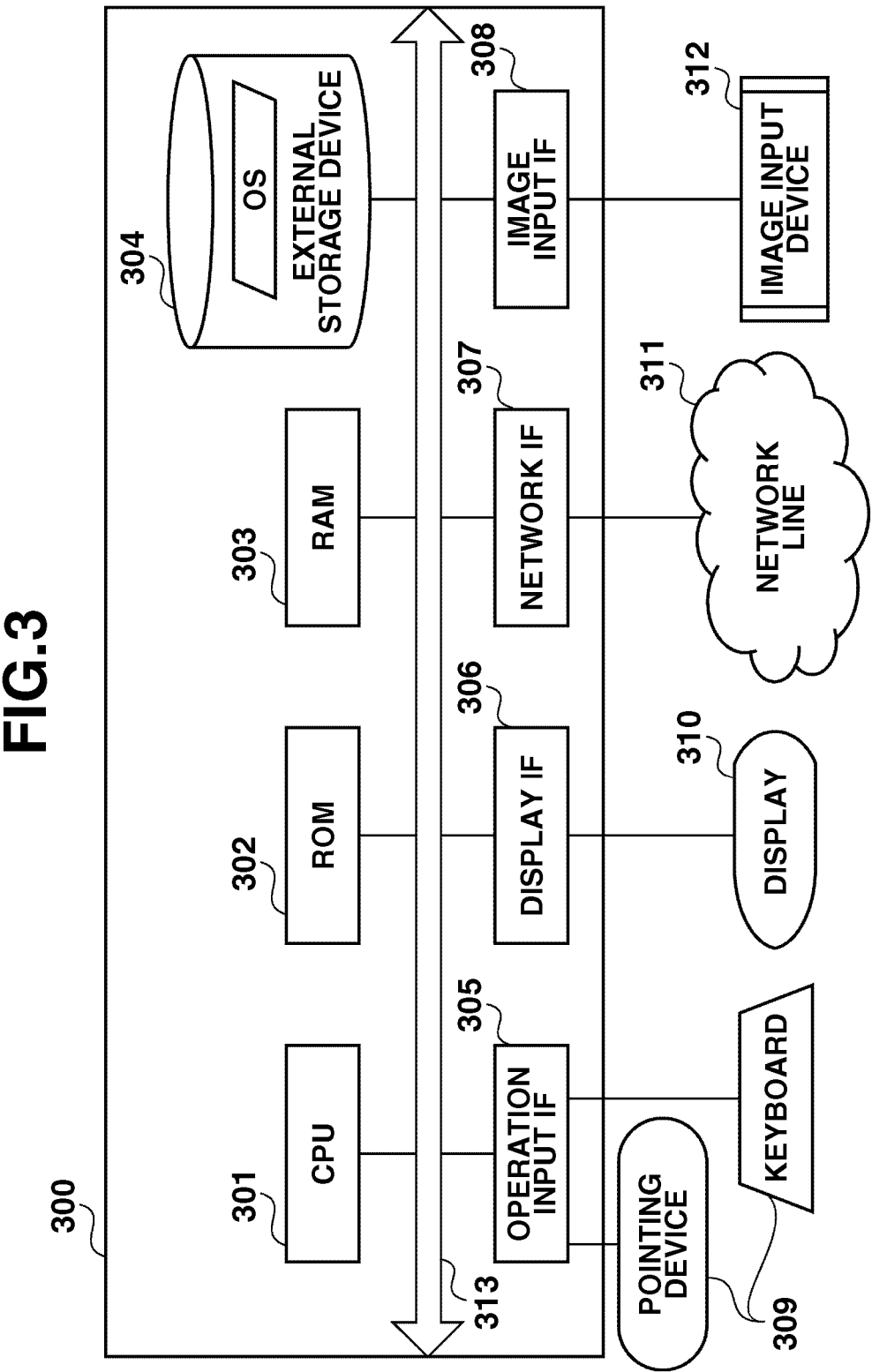
FIG. 3 is a block diagram illustrating a configuration of an information processing apparatus according to the first exemplary embodiment of the present invention.

Referring to FIG. 3, a control unit 301 such as a central processing unit (CPU) totally controls the information processing apparatus 300. A read only memory (ROM) 302 stores programs and parameters which do not need a change. A random access memory (RAM) 303 temporarily stores programs and data supplied from an external apparatus. An external storage device 304 may be a hard and a memory card disk which are fixedly installed in the information processing apparatus 300, or an optical disk detachably attached to the information processing apparatus 300. The external storage device 304 stores an operating system (OS) and a remote shooting program.

An operation input unit interface 305 interfaces with input devices for receiving a user operation and inputting data, such as a pointing device and a keyboard 309. A display interface 306 interfaces with a monitor 310 for displaying data stored in the information processing apparatus 300 and supplied data. A network interface 307 connects the information processing apparatus 300 with a network line. A system bus 313 connects each of the units 301 to 308 to enable communication therebetween.

Figure 4:
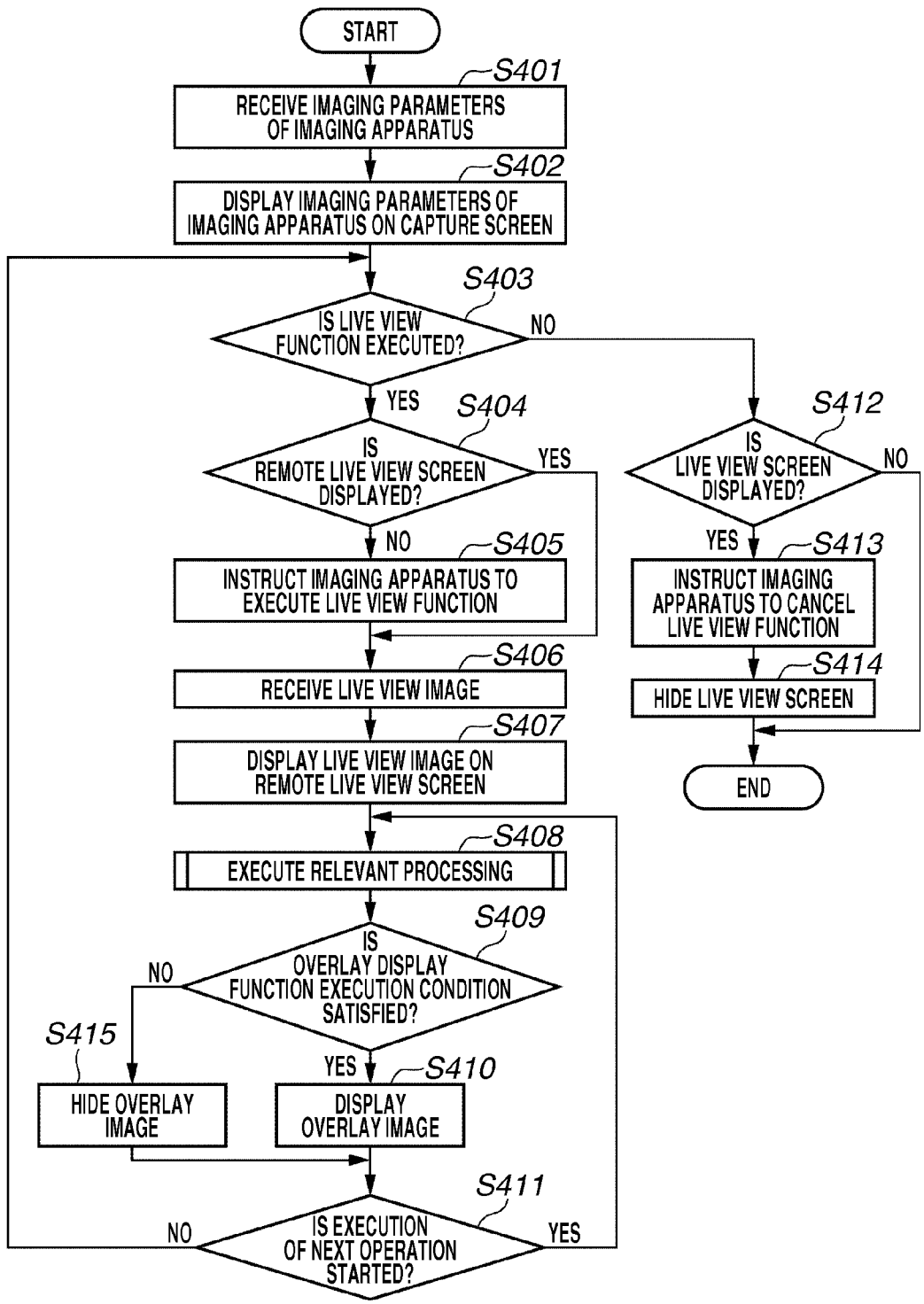
FIG. 4 is a flow chart illustrating operations of the remote shooting system according to the first exemplary embodiment of the present invention.

Operations of the information processing apparatus 300 in the remote shooting system according to the present exemplary embodiment will be described below with reference to FIG. 4. In the remote shooting system according to the present exemplary embodiment, the information processing apparatus 300 is communicably connected with the imaging apparatus 102 and both apparatuses are in an operable state when the power thereof are turned on. The following operations of the imaging apparatus 102 are implemented when the CPU 236 loads an internal program from the memory unit (2) 237 and activates the program. Further, the following operations of the information processing apparatus 300 are implemented when the CPU 301 loads an OS and a remote shooting program from the external storage device 304 and activates these programs.

First, in step S401, the CPU 301 of the information processing apparatus 300 receives from the imaging apparatus 102 shooting parameters currently set in the imaging apparatus 102. In step S402, the CPU 301 displays the received shooting parameters on a capture screen.

Figure 5:
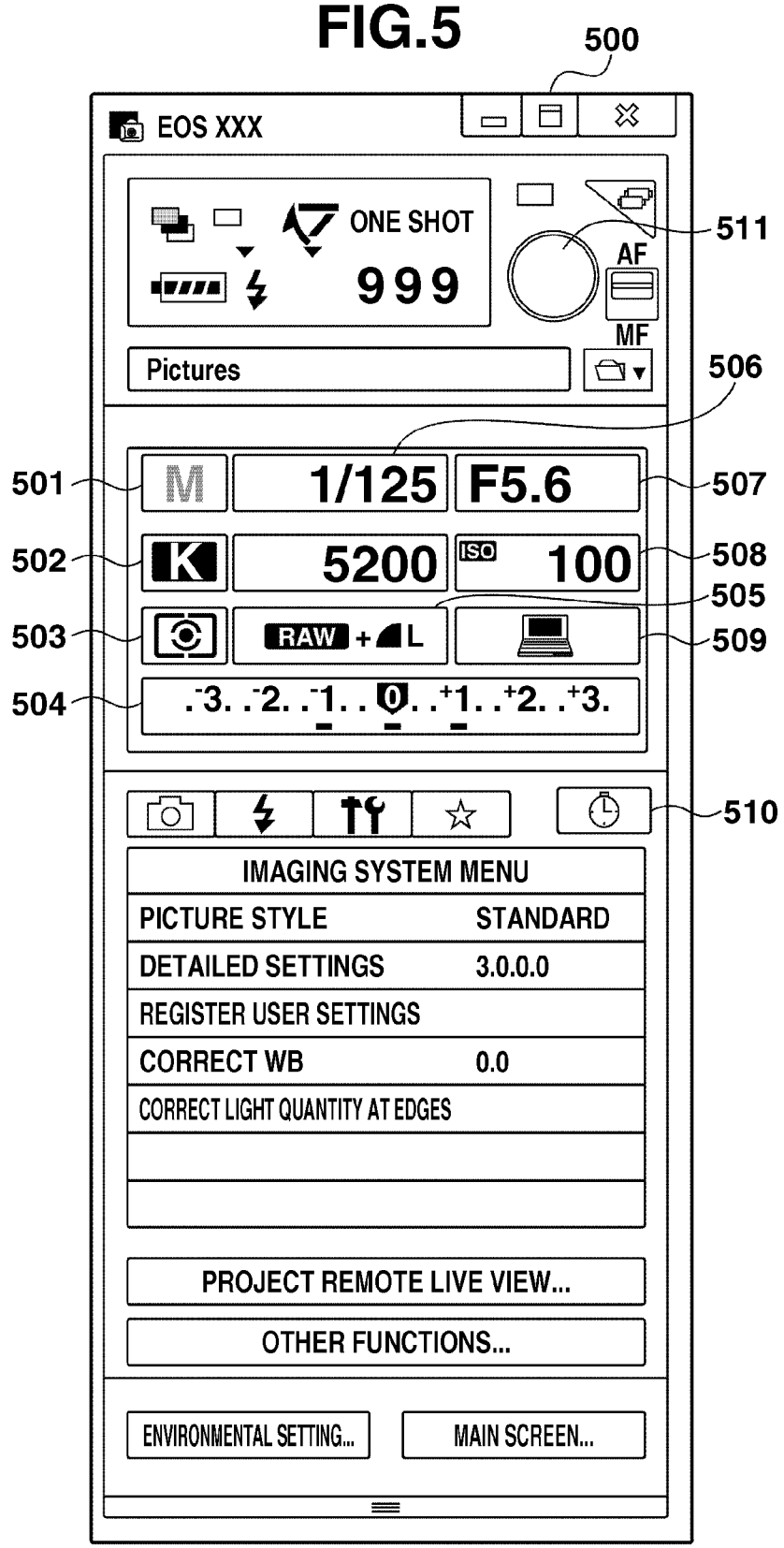
FIG. 5 illustrates a capture screen to be displayed on a display according to the first exemplary embodiment of the present invention.

FIG. 5 illustrates an example of the capture screen according to the present exemplary embodiment. On the capture screen 500, an operating state and setting values of the imaging apparatus 102 are displayed. For example, the capture screen 500 includes displays of shooting parameters such as a shooting mode 501, a white balance 502, a light metering mode 503, an exposure level 504, a recording image quality 505, a shutter speed 506, an aperture value 507, an ISO sensitivity 508, and so on. The capture screen 500 also includes displays of a captured image storage location 509 and shooting function items such as timer shooting 510.

When the photographer presses a shooting button 511, the CPU 301 instructs the imaging apparatus 102 to capture an image, receives the captured image from the imaging apparatus 102, and displays the image on a quick preview screen. In response to a user operation, the CPU 301 resets items displayed on the capture screen 500, and notifies the imaging apparatus 102 of the reset items. The imaging apparatus 102 applies the notified items and performs shooting processing.

Imaging modes includes, for example, an auto shooting mode in which function settings are automatically performed according to a subject's situation at the time of shooting, a scene mode in which predetermined function settings are performed, and a manual shooting mode in which all function settings are manually performed by the user. The imaging mode further includes one aperture priority mode in which the aperture value is set by the user and the shutter speed is automatically set according to the subject's situation at the time of shooting, and another shutter speed priority mode in which the shutter speed is set by the user and the aperture value is automatically set according to the subject's situation at the time of shooting. Further, in the timer shooting, an image is captured when a set delay time has elapsed, and a set number of images is captured at specified time intervals.

In step S403, the CPU 301 determines whether the live view function is set to be executed. When the live view function is set to be executed (YES in step S403), the processing proceeds to step S404. In step S404, the CPU 301 determines whether the remote live view screen has already been displayed on the display 141. When the remote live view screen is not displayed on the display (NO in step S404), the processing proceeds to step S405. In step S405, the CPU 301 instructs the imaging apparatus 102 to execute the live view function. In step S406, the information processing apparatus 300 receives a live view image from the imaging apparatus 102 at predetermined time intervals. In step S407, the information processing apparatus 300 displays the live view image on the remote live view screen while updating the live view image.

FIG. 6A illustrates an example of the remote live view screen according to the present exemplary embodiment. A remote live view screen 600 includes a live view area 601, a first operation portion 602, and a second operation portion 603. The first operation portion 602 includes input fields for setting values of a white balance 621, a focus 622, and aperture reducing 623. The second operation portion 603 includes selection fields for display items of the live view area 601.

In step S408, when the user operates the first and second operation portions 602 and 603 on the remote live view screen 600, the CPU 301 executes relevant processing in response to the user operation.

For example, when the user operates the white balance 621 to select a type of white balance to be applied to the image, the CPU 301 applies the selected white balance to the live view image and displays it in the live view area 601.

When the user operates the white balance 621 to activate click white balance, the CPU 301 displays a pointer in the live view area 601. When the user moves the pointer and clicks a portion to be used as a reference for white, the CPU 301 instructs the imaging apparatus 102 to capture an image again with using the clicked portion as a reference for white. Then, the CPU 301 receives a newly captured live view image from the imaging apparatus 102 and displays it in the live view area 601.

When the user operates the focus 622 to activate autofocus (AF) focus adjustment, the CPU 301 displays an AF frame in the live view area 601. When the user selects the AF frame at a target position for focus adjustment, the CPU 301 instructs the imaging apparatus 102 to perform focus adjustment with reference to the selected AF frame. Then, the CPU 301 receives a newly captured live view image from the imaging apparatus 102 and displays it in the live view area 601.

When the user operates the focus 622 to activate manual focus adjustment, and specify a range to be enlarged on the live view image in the live view area 601, the CPU 301 enlarges the specified range and displays it in the live view area 601. When the user operates the focus 622 to adjust a focus position, the CPU 301 instructs the imaging apparatus 102 to perform focus adjustment with reference to the adjusted focus position. Then, the CPU 301 receives a newly captured live view image from the imaging apparatus 102 and displays it in the live view area 601.

When the user operates the aperture reducing 623 to instruct a check on a depth of field and exposure, the CPU 301 displays the live view image in the live view area 601 with a luminance reflecting the setting value of the exposure level 504 of the capture screen 500, and enables the user to check the depth of field easier. The CPU 301 normally displays the live view image with a luminance providing highest visibility regardless of the setting value the exposure level 504.

When the user operates the second operation portion 603 to instruct display of grid lines, the CPU 301 overlays grid lines onto the live view image in the live view area 601. Otherwise, when the user operates the second operation portion 603 to instruct nondisplay of the grid lines, the CPU 301 hides the grid lines from the live view area 601.

When the user operates the second operation portion 603 to specify an aspect ratio, the CPU 301 overlays vertical lines corresponding to the specified aspect ratio onto the live view image in the live view area 601.

When the user operates the second operation portion 603 to instruct rotation of the image, the CPU 301 rotates the live view image and displays the rotated image in the live view area 601.

In step S409, the CPU 301 detects contents of the operation on the capture screen 500 or the remote live view screen 600 and determines whether a condition for executing an overlay display function (hereinafter referred to as overlay display function execution condition) is satisfied. When the overlay display function is set to be executed and the operation for permitting overlay display is performed in step S408, the CPU 301 determines that the overlay display function execution condition is satisfied.

The external storage device 304 of the information processing apparatus 300 stores a remote shooting program in which operation types not permitting overlay display are set. The operation types not permitting overlay display include operations instructed from the first operation portion 602, such as adjustment of the white balance using the white balance 621, adjustment of the focus position using the focus 622, and check on the depth of field and exposure using the aperture reducing 623.

Therefore, operation types other than the above described ones permit overlay display. Operation types permitting overlay display include operations instructed from the second operation portion 603, such as display of grid lines, a change in the aspect ratio, and rotation of an image. More specifically, when shooting processing is performed through a specified operation, an operation requiring image composition check by the user may possibly be set to permit overlay display.

After resetting shooting parameters in the capture screen 500, availability of overlay display (overlay display is permitted or not) is set for each item in the remote shooting program stored in the external storage device 304. Even when the overlay display function is set to be executed, when an operation not permitting overlay display is being executed, the CPU 301 determines that the overlay display function execution condition is not satisfied.

Although, in the present exemplary embodiment, operation types not permitting overlay display are stored in the external storage device 304, operations permitting overlay display may be stored and used for the determination in step S409.

Further, when the overlay display function is set not to be executed, the CPU 301 determines that the overlay display function execution condition is not satisfied regardless of the operation contents executed for the information processing apparatus 300.

An operating state of the imaging apparatus 102 may be included in the overlay display function execution condition. For example, upon reception of a notification from the imaging apparatus 102 that a predetermined operation such as focus adjustment is being executed, in step S409, the CPU 301 determines that the overlay display function execution condition is not satisfied. More specifically, when the overlay display function is set to be executed and the operating state of the imaging apparatus 102 and the operation contents for the information processing apparatus 300 permit overlay display, in step S409, the CPU 301 determines that the overlay display function execution condition is satisfied.

When the CPU 301 determines that the overlay display function execution condition is satisfied (YES in step S409), the CPU 301 reads a predetermined image from the external storage device 304 and applies image processing to the image to achieve a predetermined transmittance and generate an overlay image. The predetermined image is selected in response to a user operation. In step S410, the CPU 301 overlays the overlay image onto the live view image in the live view area 601.

Figure 6B:
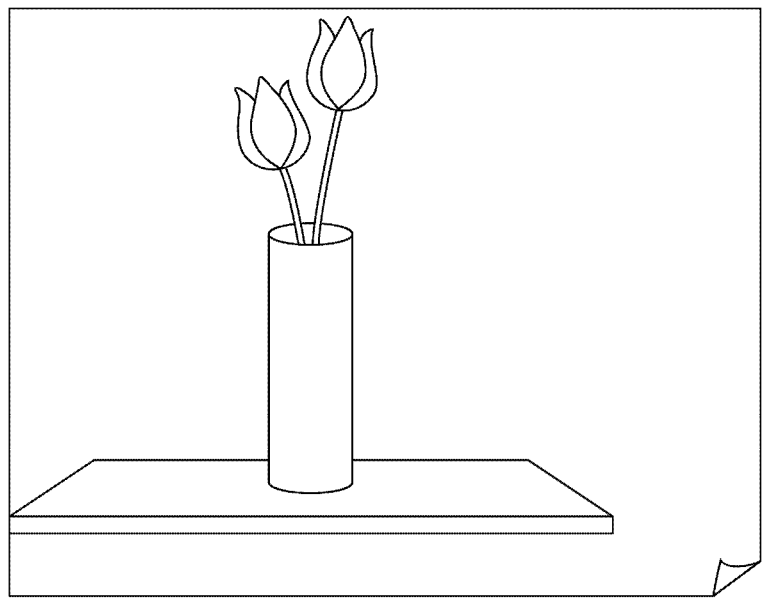

For example, when an image illustrated in FIG. 6B is selected, the CPU 301 overlays the overlay image onto the live view image, as illustrated in FIG. 6C. The CPU 301 may generate an overlay image in advance or acquire an overlay image from an external apparatus or other memory media to make it unnecessary to generate an overlay image each time.

Otherwise, when the CPU 301 determines that the overlay display function execution condition is not satisfied (NO in step S409), the processing proceeds to step S415. In step S415, the CPU 301 hides the overlay image. More specifically, when the overlay image has already been overlaid onto the live view image in the live view area 601, the CPU 301 hides the overlay image and displays only the live view image. When the overlay image is not displayed in the live view area 601, the CPU 301 displays only the live view image as it is in the live view area 601.

In step S411, the CPU 301 detects whether execution of next operation is started. When execution of the next operation is started (YES in step S411), the processing returns to step S408. In step S408, the CPU 301 executes the relevant processing. Otherwise, when execution of the next operation is not started (NO in step S411), the processing returns to step S403.

On the other hand, when the live view function is set not to be executed (NO in step S403), the processing proceeds to step S412. In step S412, the CPU 301 determines whether the remote live view screen 600 is displayed on the display 141. When the CPU 301 determines that the remote live view screen 600 is still displayed on the display 141 (YES in step S412), the processing proceeds to step S413. In step S413, the CPU 301 instructs the imaging apparatus 102 to stop execution of the live view function. In step S414, the CPU 301 hides the remote live view screen 600. Upon reception of the instruction to stop execution of the live view function, the imaging apparatus 102 stops transmission of the live view image to the information processing apparatus 300. Then, the processing ends.

Although the present exemplary embodiment has specifically been described based on a case where overlay display is hidden when the overlay display function execution condition is not satisfied, the processing is not limited thereto. Overlay display may be retained with increased transmittance. Further, in this case, the CPU 301 may set the transmittance to the remote shooting program in association with an operation type and store the remote shooting program in the external storage device 304. Then, the CPU 301 may generate an overlay image by processing the original image to achieve a transmittance associated with the operation type.

As described above in the present exemplary embodiment, the CPU 301 can switch a state between overlaying the overlay image onto the live view image and hiding the overlay image depending on the operation type. Thus, even when the overlay display function is set to be executed, overlay display is automatically hidden if overlay display disturbs a user operation. Therefore, the user can easily perform operations while checking details only with the live view image or while checking image composition with overlay display.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-017009 filed Jan. 28, 2010, which is hereby incorporated by reference herein in its entirety.

What is claimed is:

1. An information processing apparatus capable of communicating to an imaging apparatus, the information processing apparatus comprising:
   a storage unit configured to store an overlay image in advance in a storage device;
   a receiving unit configured to receive, from the imaging apparatus, a live view image obtained by executing shooting processing in the imaging apparatus based on a shooting setting;
   a display unit configured to display the received live view image on a screen;
   a changing unit configured to change the shooting setting in response to a user's operation;
   a detection unit configured to detect a type of the shooting setting changed by said changing unit; and
   said display unit configured to selectively display the overlay image by overlaying it onto the live view image applied the shooting setting changed by said changing unit, in accordance with the detected type of the shooting setting.

2. The information processing apparatus according to claim 1, further comprising:
   a storing unit configured to store data indicating whether to display the overlay image or not for each type of the shooting setting based on necessity of image composition check during executing the shooting processing based on the shooting setting.

3. The information processing apparatus according to claim 1, wherein the live view image is received from the imaging apparatus at predetermined intervals, and an existing live view image is updated by a newly received live view image and displayed on the screen.

4. The information processing apparatus according to claim 1, further comprising:
   a reception unit configured to receive a notification about an operating state of the imaging apparatus; and
   a storing unit configured to store data indicating whether to display the overlay image or not for each operating state of the imaging apparatus.

5. The apparatus according to claim 1, further comprising:
   a sending unit configured to send, to the imaging apparatus, the shooting setting changed by said changing unit.

6. The apparatus according to claim 1, further comprising:
   a second receiving unit configured to receive, from the imaging apparatus, the shooting setting used for executing shooting processing in the imaging apparatus.

7. The apparatus according to claim 1, further comprising:
   a generating unit configured to generate the overlay image from a predetermined image stored in the storage device.

8. An information processing method for communicating to an imaging apparatus, the information processing method comprising:
   storing an overlay image in advance in a storage device;
   receiving, from the imaging apparatus, a live view image obtained by executing shooting processing in the imaging apparatus based on a shooting setting;
   displaying the received live view image on a screen;
   changing the shooting setting in response to a user's operation;
   detecting a type of the shooting setting changed by said changing step; and
   selectively displaying the overlay image by overlaying it onto the live view image applied the shooting setting changed by said changing step, in accordance with the detected type of the shooting setting.

9. A non-transitory computer-readable storage medium storing a program for causing a computer to execute a method for communicating to an imaging apparatus, the information processing method comprising:
   storing an overlay image in advance in a storage device;
   receiving, from the imaging apparatus, a live view image obtained by executing shooting processing in the imaging apparatus based on a shooting setting;
   displaying the received live view image on a screen;
   changing the shooting setting in response to a user's operation;
   detecting a type of the shooting setting changed by said changing step; and
   selectively displaying the overlay image by overlaying it onto the live view image applied the shooting setting changed by said changing step, in accordance with the detected type of the shooting setting.

10. The non-transitory computer-readable storage medium according to claim 9, further comprising:
    storing data indicating whether to display the overlay image or not for each type of the shooting setting based on necessity of image composition check during executing the shooting processing based on the shooting setting.

11. The non-transitory computer-readable storage medium according to claim 9, wherein the live view image is received from the imaging apparatus at predetermined intervals, and an existing live view image is updated by a newly received live view image and displayed on the screen.

12. The non-transitory computer-readable storage medium according to claim 9, further comprising:
    sending, to the imaging apparatus, the shooting setting changed by said changing step.

13. The non-transitory computer-readable storage medium according to claim 9, further comprising:
    a second receiving unit configured to receive, from the imaging apparatus, the shooting setting used for executing shooting processing in the imaging apparatus.

14. The non-transitory computer-readable storage medium according to claim 9, further comprising:
    a generating unit configured to generate the overlay image from a predetermined image stored in the storage device.

* * * * *